April 26, 1966  A. C. BAGGENSTOSS ETAL  3,248,113

BOWLING BALL

Filed June 5, 1962

INVENTORS.
ALOIS C. BAGGENSTOSS
DONAL P. DORNÉ
WILLIAM A. DUNNE
JOSEPH R. INFANTINO

BY
Arthur J. Plantamura
ATTORNEY.

United States Patent Office 3,248,113
Patented Apr. 26, 1966

3,248,113
BOWLING BALL
Alois C. Baggenstoss, Stamford, Donal P. Dorné, Monroe, and William A. Dunne, Stamford, Conn., and Joseph R. Infantino, Chappaqua, N.Y., assignors to American Machine & Foundry Company, a corporation of New Jersey
Filed June 5, 1962, Ser. No. 200,269
5 Claims. (Cl. 273—63)

This invention relates to bowling balls having a hard plastic surface layer superimposed over a core and to the method of manufacture of balls of this kind. More particularly, this invention relates to bowling balls having new and improved construction comprising a polyurethane synthetic resin surface layer.

Heretofore, attempts to make bowling balls using a variety of plastic materials have met only minor acceptance. Rubber balls have continued to be those of commercial superiority. Not only has no synthetic plastic composition achieved broad acceptance, but those sought to be introduced have been substantially inferior in characteristics to rubber balls. In particular, plastic balls heretofore made have suffered from at least one of two serious drawbacks. On the one hand, the plastic employed, although compatible with various colors, has been too soft. Consequently, the ball abrades relatively easy and has a dirt pick-up problem. Additionally, bowling balls of this type are found to seriously mark the bowling alley. On the other hand, plastic which has been sufficiently hard and provides a ball surface of attractive gloss and dirt pick-up resistance have been incapable of resisting the severe impacts to which it is subjected. These impacts soon chip the surface and render the ball unsatisfactory. Efforts in the prior art have been directed to a single plastic formulation which would provide a satisfactory answer to a synthetic resin ball acceptable in all these characteristics.

In accordance with the invention, we have discovered a bowling ball formulation having a surface layer comprising polyurethane which provides definite advantages over other plastics in characteristics including the following: the ball is self-cleaning, i.e., dirt repellant; the surface composition does not rub off on the alley and in turn it is not marked by the alley; the ball has good impact and sonic properties; in spite of its excellent hardness, it is not brittle; and the ball can be made in a full range of colors.

The advantages of the ball prepared in accordance herewith over a conventional rubber ball include: better wear and abrasion resistance; less dirt pick-up; and improved impact resistance.

According to the present invention, we have discovered that a bowling ball having a surface layer comprising polyurethane and preferably a polyurethane containing blended therewith from about 5 to about 60 percent epoxy resin based on the weight of epoxy plus polyurethane, provides a ball of highly advantageous characteristics which meets the objections present in the prior art.

It is therefore the principal object of this invention to provide a bowling ball having a polyurethane, and preferably a blend of polyurethane and epoxy resin as a surface layer over a core; the resulting ball is able to withstand severe surface impacts during play without chipping or cracking.

It is a further object of this invention to provide a bowling ball which has a surface of high and lasting gloss and which has the ability to repel dirt, resist chipping, and is of sufficient surface hardness and abrasion resistance that it does not mark the bowling alley in use.

It is a further object of this invention to provide bowling balls in a variety of colors which retain their color quality throughout the life of the ball.

Other objects and advantages will become apparent as the more detailed description of the invention develops hereinbelow.

To illustrate the essence of the invention and for a better understanding thereof, reference is made to the accompanying drawings wherein.

In manufacturing a bowling ball according to the invention, a conventional core of material such as rubber, rubber composition including materials such as cork, expanded cellular plastic cores, or resinous compositions combining wood chips, curing agents, density regulators, etc., may be employed. Suitable core-forming compositions and procedures are described in the patent application of Firth et al., U.S. Serial No. 14,620, filed on March 14, 1960, entitled, "Bowling Balls and Methods for Producing Them," and expandable or foamable resinous compositions are those disclosed, for example, in U.S. patent application of Gruss et al., Serial No. 31,161, filed on May 23, 1960, entitled, "Plastic Bowling Pin." Cores comprising sawdust bonded with a suitable resin are disclosed in U.S. Patent 2,362,269. Additionally, techniques for forming cores including the use of hollow spheres as described in the pending application of S.N. 185,601, Baggenstoss et al., entitled, "Bowling Ball," filed on April 6, 1962, may be utilized.

In applying the polyurethane resin or polyurethane resin-epoxy resin blend surface composition to the core to provide the ball, any of the various procedures known in the art may be used. Suitable methods include compression molding or extrusion molding around the core appropriately positioned in the mold; rotational casting wherein the surface shell or layer is formed in a rotating mold and thereafter filling the spherical shell such as with cellular plastic expandable in situ; liquid casting; injection molding; and the like. A particularly advantageous method comprises preforming bonnets or hemispheres in a half spherical mold and thereafter enclosing a core within two of these bonnets. The three part unit is then placed in a spherical mold and compressed and heated to cure into the formed ball in which the joiner line of the bonnets is substantially invisible. The surface layer contemplated also includes an expanded or foamed resin of fine uniform cellular structure having a relatively dense or substantially solid surface as described, for example, in the pending U.S. patent application Serial No. 31,161 mentioned hereinabove.

In its broader aspects, the invention is directed to a bowling ball comprising a surface layer varying in thickness from about 0.25 inch to about 2.0 inches of polyurethane in which up to about 60% by weight of epoxy resin based on total epoxy plus polyurethane may be included. Polyurethane composition in which from about 5 to about 40% epoxy have been found to give preferred results.

Whereas polyurethane alone reacts relatively rapidly to a thermoset condition and after molding the bonnet would ordinarily not lend itself to further deformation, the incorporation of epoxy imparts a reservoir of uncured property to the blend thereby affording the means to further modify the molded piece and to provide improved interadhesion between the core and the preformed bonnets forming the ball during the molding step.

Figure 1:
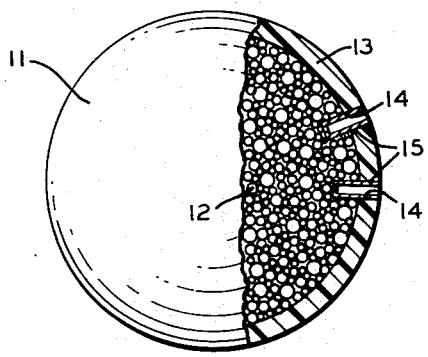
FIG. 1 is a bowling ball partially in section illustrating the plastic layer of resin superimposed over an expanded cellular plastic core.
Figure 2:
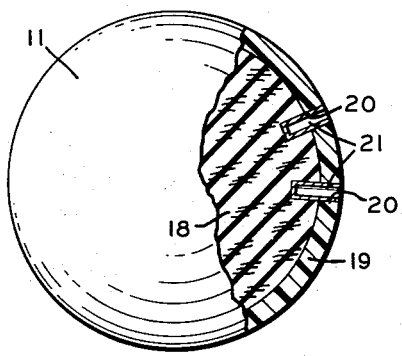
FIG. 2 is a bowling ball partially in section illustrating another embodiment in accordance with the invention, comprising the plastic surface over a conventional rubber-cork core.

Reference to FIG. 1 of the drawing illustrates a bowling ball 11 formed in accordance with the teachings of the invention in which an expanded cellular core 12 is encased in a polyurethane composition surface layer 13 through which recesses 14 for finger holes extending into the core are provided. Optionally, thimbles 15 may be inserted in the recesses 14. The structure illustrates in FIG. 2 is similar with the exceptions that the core 18 of the ball comprises a rubber-cork mixture over which the layer 19 is superimposed. The finger holes 20, shown in the ball may be made by drilling at suitably spaced intervals in accordance with conventional methods or in accordance with the disclosure of U.S. Patent 2,414,672, wherein tubular thimbles 21 are secured to the holes in the ball.

Figure 3:
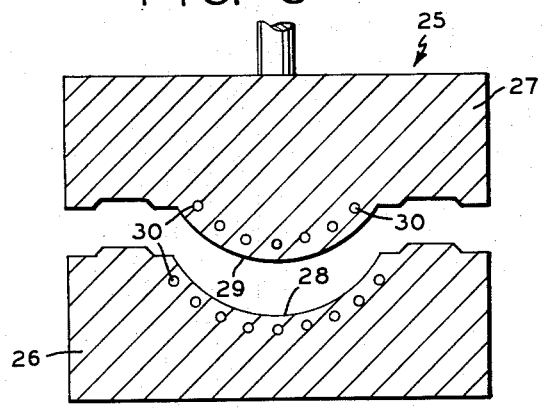
FIG. 3 illustrates schematically in cross-section a mold suitable for preforming bonnets, two of which are used to cover a bowling ball core.
Figure 4:
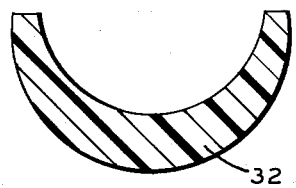
FIG. 4 illustrates in section a bonnet shaped by the mold of FIG. 3.

FIG. 3 merely illustrates a mold 25 of suitable shape comprising lower half 26 and upper half 27 registrable therewith in suitably spaced relationship when closed. The lower half comprises a concave recess 28 with which the convex mold head 29 registers. The mold is suitably provided with temperature controlling coils 30 through which a heat exchange fluid is circulated. Use of the partially cured polyurethane preforms or bonnets 32 illustrated in FIG. 4 may be formed in the mold of FIG. 3 or in any conventional mold known in the art and various types of which are commercially available.

Figure 5:
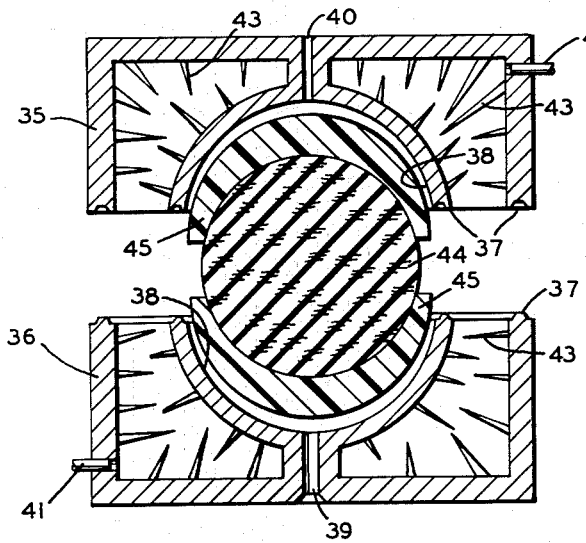
FIG. 5 shows a suitable mold partially closed into which a core and a pair of bonnets both of which are illustrated in cross-section, have been introduced preparatory to forming a ball.

Molding of the bonnet over the core is illustrated in FIG. 5. As shown, a mold which comprises mold halves 35 and 26 of conventional design having semi-spherical recesses adapted to register with, and be secured to, each other at 37 to form a spherical recess which meets ABC ball specifications may be employed. In addition to its use in conjunction with preformed bonnets 45, the mold of FIG. 5 is constructed and arranged so that it may be suitably utilized and adapted to mold balls alternately by castings, by injection molding or by extrusion, depending on which of the methods is most suitable for the available commercial form of resin and resin preconditioning apparatus. The mold is constructed so as to form recess 38 and is equipped with a sprue 39 having a closure valve (not shown) through which the resinous feed is introduced. When bonnets are used, this valve is closed. A capillary hole or vent 40 serves to indicate when the mold is filled, generally for those techniques utilizing injection, extrusion or casting techniques. A suitable arrangement for heat transfer fluid, either liquid or gas, may be introduced into inlet 41 and withdrawn at 42. Baffles 43 promote heat exchange within the mold. Situated in the mold of FIG. 5 is a conventional rubber-cork core 44 contained within bonnet preforms 45.

After the ball is formed by closure of the mold under pressure, little or no flashing needs to be removed and the ball may be utilized with buffing or otherwise finishing, although preferably a polishing operation is performed on the ball.

For the purpose of providing more specific details, the manufacture of bowling balls according to the examples provided hereinbelow will be made by one of three procedures described herein generally. The first method employs a core over which layers of synthetic resin are applied either by casting, extrusion or injection molding compositions in keeping with the inventive concept. In the second procedure, a rotational mold is employed, designed so that the surface layer build-up is from the surface of the ball radially inward; thereafter this surface sheel is filled as by introduction, into the formed surface shell, of cellular plastic which is expandable in situ. In the third method, hemispherical preforms or bonnets which are partially cured as they are molded to make the preform, are placed about a spherical core and the two hemispherical preforms are compression molded into an integral structure. It will be apparent that variations in the foregoing procedures, or alternate procedures known in the art, may be employed in preparing a ball of the novel composition provided by the inventive concept.

In general, where a preformed core is used, such cores should have a diameter undersized by at least 0.25 inch and preferably 0.35 inch with respect to the finished ball, and up to about four inches undersized, although even small cores are not precluded.

The following procedures for preparing a core of rubber and cork and of expanded cellular plastic may be used. It will be understood, however, that the invention is not limited to any particular technique for core formation and that the invention contemplates the use of suitable cores from any known procedure.

A blend of synthetic rubber and cork is molded in a suitable shape with a dense piece of material, such as lead oxide, approximately ¼ inch thick by 4 inches in diameter is inserted in the core to provide for balance and weight control.

Plastic foamed cores properly balanced are prepared in the following manner to provide a core of any desired weight. A foamable composition is prepared comprising 8 lbs. of low density commercial polyethylene which is blended with 0.25 lb. of low temperature commercial blowing agent and then extruded into a 8.1-inch diameter preheated mold. The mold is cooled and the core recovered. The density of the core is 0.8 and is used in producing a 10 lb. ball. Expanded cores of greater density useful in making heavier balls may be obtained by adjustment of the amount or kind of expandable foam composition and/or quantities of blowing agent.

In the method for producing a finished surface shell which may be used hollow if of sufficient thickness and weight, but which is preferably filled after shaping, a rotational mold may be employed in which a resinous composition is injected so that the build-up of the shell is from the outside surface inward until a shell of the desired thickness is formed. When the appropriate depth of solid plastic layer has been attained, a foamable plastic may be introduced into the central cavity of the hollow surface sphere and expanded therein. In this embodiment, it will be apparent that a continuous manufacture of bowling balls is possible by continuously mixing and addition of proper resins in suitable order into the rotational mold such as through a sprue into the center of the ball.

In the bonnet preform technique, the bonnet formulation is made up and cast into an open mold to approximately 2–2½ inches from parting line (mold diameter, 8.68 inches–8.70 inches). At a point just before gelation, a molding half sphere head is placed into the mold, forced down to a position so as to leave an excess of material at the bottom of the mold (diameter of sphere, 8.125 inches), i.e., the bonnet is thicker at the center, and when the material is solidified and at room temperature, the head is removed, along with the preformed bonnets. The bonnets are thereafter used by placing over a core in a compression mold and molded into a unitary structure.

In molding the bonnets over the core, the core is placed in the mold and held in a centered position by the preformed bonnets. The two halves are clamped together, leaving a space at the parting line which due to the size and shape of the preforms is filled during molding providing a substantially uniform surface layer around the sphere. The mold assembly is then heated to the point where the bonnet material flows. Pressure is used to flash out the excess material at the parting line. When the mold is completely closed, it is thereafter held at suitable temperature, e.g., about 100° C., until cure is substantially complete.

In order that the invention may be more fully understood, the following illustrative specific examples are provided. It will be understood that the invention is not to be limited to specific details enumerated. Parts are parts by weight unless otherwise expressed.

*Example 1*

Into a rotary spherical mold having the outer dimension of a bowling ball leaving tolerance for final polishing, i.e., about 8.65 inches diameter is introduced sufficient liquid epoxy-urethane (30:70) resin suitable to provide a spherical outer layer of about 0.5 inch. The epoxy resin is a bisphenol A-epichlorohydrin condensate type [1]. The urethane is a diisocyanate polyol prepolymer of somewhat slower reactivity than pure polyurethane. Typical of suitable diisocyanate polyols prepolymers are the Adiprenes marketed by E. I. du Pont de Nemours & Co. The free isocyanate groups in the prepolymer are substantially reduced (4–7%) and its reactivity towards diamines is thus at a practical rate. A layer of 1.8 inches overall is formed. Moca [2] is used as curing agent. Heat is applied alternately (180° C.–230° C.) as the mold is rotated. With external heating, the outer skin attains the curing temperature first and cure is initiated.

*Example 2*

50 parts epoxy resin [3] and 50 parts of polyurethane [4] are mixed and deaerated at 100° C. under vacuum. Molten Moca, 30 parts, (90° C.) are added and a cover 0.5 inch thick is cast immediately around a rubber core. The mixture gels in approximately 2 hours at 110° C. and is afterwards cured for 16 hours at 100° C. A tough cover results, having a Shore D hardness of 82 and an impact strength of 0.6 notched Izod. Adhesion to the rubber core is excellent. The resulting ball was used and gave very advantageous performance.

*Example 3*

60 parts epoxy resin [5], 40 parts polyurethane [6] and 26 parts methylene dianiline are compounded, cast around a rubber cork core and gelled within 20 minutes. The resulting surface resin has an impact strength of 0.8; a Shore D hardness of 78 and excellent adhesion to the core. The ball performed very satisfactorily in lane use.

*Example 4*

A formulation comprising 100 parts polyurethane [7] and 30 parts Moca is prepared. Since the reaction rate of these two components is extremely fast, the components are mixed by machine in a mixing head and dispensed into a mold immediately. A hard, very tough cover is the result having a Shore D hardness-78 and an Izod impact-4. Adhesion to rubber is suitable, although not as superior as when epoxy is present in the formulation. Absence of epoxy necessitated rapid utilization of the mix and resulted in a processing disadvantage due to the fast curing action.

*Example 5*

In the following example a solid resinous composition comprising 40 parts of granular urethane polymer [8] is blended thoroughly with 60 parts of granular epoxy resin [9] injection molded around a wooden core. No curing is necessary. Adhesion is suitable and may be improved by coating core with film of polyethylene acetate or soft epoxy resin. A surface layer of Shore D hardness-80 and impact-1.2 is obtained.

*Example 6*

A polyethylene foam core is suspended and rotated in two planes and while rotating a liquid plastic mix is poured onto the core. During this operation, the mass is heated. The molding apparatus employed for the core is a unit available from Presform Mold Co. of Cuyahoga Falls, Ohio.

A layer system comprising 20 parts epoxy resin and 80 parts urethane resin is formulated using a general purpose bisphenol-epichlorohydrin resin (Shell, Epon 815) and a prepolymerized and stabilized urethane (Du Pont Adiprene L–167). After the molding operation is completed, the ball is buffed. It has a surface of excellent resistance to abrasion or chipping and to dirt pick-up. It performs very satisfactorily in play.

*Example 7*

Using the following composition, four shells are prepared by rotational casting, each having a ½-inch thick hollow shell. A blend comprising 4.0 parts of polyurethane resin and epoxy resin in a ratio of 80:20, respectively, and 1.0 part of dichlorodiaminodiphenyl methylene is prepared and cast. The casting is cured for 2 hours at 210° F. Two of the hollow spheres are filled with (a) plastic and filler and (b) two with a foamed polyethylene resin. One of each of (a) and (b) were made to have a total weight of 10 lbs. and the other 16 lbs. The outer shell has excellent gloss and hardness. It suitably resists abrasion and dirt pick-up. Performance of each ball is very satisfactory.

*Example 8*

A mix of 50 parts of epoxy resin,[10] 50 parts of polyurethane [11] are mixed and de-aired at 100° C. under vacuum. Thirty parts of molten Moca at 90° C. are mixed with the resin and dispensed using automatic dispensing equipment into a closed bowling ball mold containing a spherical bowling ball core which is smaller than the mold cavity and is spaced from the mold. After the void in the mold containing the core is completely filled with the polyurethane-epoxy resin-Moca mix, the mold opening is plugged and the mold rotated on two or more axes for two hours at 110° C. until the coating is gelled. The ball may then be removed from the mold for a 16-hour post cure period at 100° C.

*Example 9*

Using the polyurethane resin-epoxy resin blend of Example 1, partial cured preforms or bonnets are prepared in the manner, and having mold dimensions, described hereinabove. Two of the bonnets so prepared are cupped over a rubber-cork core and introduced into a mold. After molding under pressure and heat, until the bonnets completely encompass the core to form an integral surface layer, the ball is buffed to remove flashing and drilled. The appearance, durability and performance of the ball are excellent.

*Example 10*

The procedure of Example 9 is substantially repeated with the exception that the preform bonnets are prepared with the solid polyurethane resin-epoxy resin blend of Example 8 and the core employed is an expanded cellular polyethylene composition. The resultant ball performs with excellent results.

---

[1] Resins of this kind are available commercially from Ciba Products Corp. as Araldite 502 and 6010 and from Shell Chemical Corp. as Epon 815 and 828.
[2] 4,4′ methylene-bis-(2-chloroaniline).
[3] Epon 815, Shell Chemical Corp.
[4] Adiprene L–167.
[5] Epon 828, Shell Chemical Corp.
[6] Adiprene L–100.
[7] Adiprene L–315, E. I. du Pont de Nemours & Co.
[8] "Texin," from Mobay Chemical Co.
[9] Shell Chemical Co., Epon 1001.
[10] Shell Chemical Corp., Epon 815.
[11] Adiprene 213.

The urethanes useful in the invention may be characterized as prepolymerized isocyanates containing approximately 4–5% per isocyanate groups which are still able to react to completion and to bring the prepolymer to the final solid stage. In general, polyester-isocyanate prepolymers will result in hard elastomers, while polyglycol-isocyanates and carboxylic acid-isocyanates result in somewhat softer elastomers. In the latter category are such polyurethanes as the E. I. du Pont de Nemours & Co. products marketed as Adiprene LD 167, 213, 305, yielding hard vulcanizates and having the following general formula in which R is an alkyl radical of up to about 12 carbon atoms or an aromatic or alkyl-aromatic radical: e.g., toluene 2,4-diisocyanate, toluene 2,6-diisocyanate; $R^1$ is generally an aliphatic radical between 2 and about 12 carbon atoms containing 2 or more OH groups; e.g., polytetramethylene ether glycol; and $n$ is an integer providing an equivalent weight per NCO group between about 110 and 160.

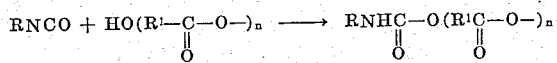

Polyurethanes such as L-100 on the other hand result in soft end products and have the following general formula:

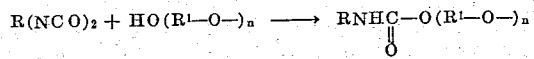

Suitable polyurethanes may be prepared by reacting a polytetramethylene ether glycol with an organic diisocyanate such as toluene-2,4-diisocyanate or an isomeric mixture of toluene 2,4-diisocyanate with up to about 25 percent by weight of toluene -2,6-diisocyanate. The molecular weight of this polyurethane is preferably between 800 and 3000 with a free isocyanate content between 4 and 10 percent.

Epoxy resins found suitable as modifiers of the polyurethane resin include those bisphenol A epichlorohydrin condensation product, having an epoxy equivalent weight preferably in the range of 170–525. The epoxy resins include those containing a reactive diluent such as allyl, butyl or phenyl glycidyl ether.

Suitable amines as activators or curing agents in addition to 4,4′ methylene bis-(2-chloroaniline) and 4,4′ methylene bisaniline which produce advantageous results include such as ethylene diamine, tetraethylene pentamine aminoethyl piperazine, various alkylamines and arylamines and the like.

It wil be apparent to those skilled in the art that various modifications may be made in the invention without departing from the scope of the invention. Accordingly, the invention is not to be limited except insofar as necessitated by the appended claims.

We claim:
1. A bowling ball having a surface layer of from about 0.25 inch to about 2.0 inches in thickness comprising polyurethane resin in admixture with up to about 60% by weight of epoxy resin based on the weight of epoxy and polyurethane and having a durometer hardness of from about 60 to about 100.
2. A bowling ball having a surface layer of from about 0.25 inch to about 2.0 inches in thickness comprising polyurethane resin in admixture with between about 5 to about 40% by weight of epoxy resin based on the total weight of epoxy and polyurethane and having a durometer hardness of from about 60 to about 100.
3. The bowling ball of claim 1 in which said surface layer covers a core comprising a resinous composition.
4. The bowling ball of claim 1 in which said surface layer covers a rubber-cork core.
5. The bowling ball of claim 1 in which said surface layer covers a cellular plastic core.

References Cited by the Examiner

UNITED STATES PATENTS

| | | | |
|---|---|---|---|
| 573,797 | 12/1896 | Rockwell | 273—82 |
| 575,128 | 1/1897 | Rockwell | 273—63 |
| 1,201,502 | 10/1916 | Roberts | 18—59 |
| 1,518,130 | 12/1924 | Barach | 273—82 |
| 2,166,950 | 7/1939 | German et al. | 273—82 |
| 2,291,738 | 8/1942 | Luth et al. | 273—63 |
| 2,414,672 | 1/1947 | Sauer | 273—63 |
| 2,787,024 | 4/1957 | Smith | 18—59 |

FOREIGN PATENTS 641,073   5/1962   Canada.

RICHARD C. PINKHAM, *Primary Examiner.*

L. W. VARNER, *Examiner.*